(12) United States Patent
Orosa et al.

(10) Patent No.: US 8,147,207 B2
(45) Date of Patent: Apr. 3, 2012

(54) COMPRESSOR BLADE HAVING A RATIO OF LEADING EDGE SWEEP TO LEADING EDGE DIHEDRAL IN A RANGE OF 1:1 TO 3:1 ALONG THE RADIALLY OUTER PORTION

(75) Inventors: John Orosa, Palm Beach Gardens, FL (US); Matthew Montgomery, Jupiter, FL (US)

(73) Assignee: Siemens Energy, Inc., Orlando, FL (US)

( * ) Notice: Subject to any disclaimer, the term of this patent is extended or adjusted under 35 U.S.C. 154(b) by 854 days.

(21) Appl. No.: 12/204,034

(22) Filed: Sep. 4, 2008

(65) Prior Publication Data

US 2010/0054946 A1 Mar. 4, 2010

(51) Int. Cl.
F01D 5/14 (2006.01)
(52) U.S. Cl. .............. 416/234; 416/223 R; 416/238; 415/182.1
(58) Field of Classification Search ............ 416/223, 416/238, 243
See application file for complete search history.

(56) References Cited

U.S. PATENT DOCUMENTS

| | | |
|---|---|---|
| 3,193,185 A | 7/1965 | Erwin et al. |
| 4,682,935 A | 7/1987 | Martin |
| 4,826,400 A | 5/1989 | Gregory |
| 5,088,892 A | 2/1992 | Weingold et al. |
| 5,167,489 A | 12/1992 | Wadia et al. |
| 5,642,985 A | 7/1997 | Spear et al. |
| 6,071,077 A | 6/2000 | Rowlands |
| 6,195,983 B1 | 3/2001 | Wadia et al. |
| 6,299,412 B1 | 10/2001 | Wood et al. |
| 6,328,533 B1 | 12/2001 | Decker et al. |
| 6,331,100 B1 | 12/2001 | Liu et al. |
| RE38,040 E | 3/2003 | Spear et al. |
| 6,554,569 B2 | 4/2003 | Decker et al. |
| 6,709,233 B2 | 3/2004 | Haller |
| 6,755,612 B2 | 6/2004 | Shahpar et al. |
| 6,899,526 B2 | 5/2005 | Doloresco et al. |
| 7,052,237 B2 | 5/2006 | Segawa et al. |

OTHER PUBLICATIONS

Harald Passrucker et al.; The Effect of Forward Sweep in a Transonic Compressor Rotor; Proc. 5th European Conference on Turbomachinery (Euroturbos); Mar. 2003; pp. 17-22; Praha, Czech Republic.

(Continued)

*Primary Examiner* — Anh Mai (57) ABSTRACT

An airfoil for use as rotor blades in compressors for turbomachines, such as gas turbine engines. The airfoil includes increased forward sweep and forward dihedral effective to reduce losses generated by interaction of tip clearance flow, secondary flows and passage shocks.

19 Claims, 7 Drawing Sheets

OTHER PUBLICATIONS

A.R. Wadia et al.; Inner Workings of Aerodynamic Sweep; International Gas Turbine & Aeroengine Congress & Exhibition; Jun. 2-5, 1997; pp. 1-15; Orlando, FL.

J.D. Denton et al.; The Effects of Lean and Sweep on Transonic Fan Performance; Proceedings of ASME Turbo Expo 2002; Jun. 3-6, 2002; pp. 1-10; GT-2002-30327; Amsterdam, The Netherlands.

Simon J. Gallimore et al.; The Use of Sweep and Dihedral in Multi-stage Axial Flow Compressor Blading; Part I: University Research and Methods Development; Proceedings of ASME Turbo Expo 2002; Jun. 3-6, 2002; pp. 1-15; GT-2002-30328; Amsterdam, The Netherlands.

Simon J. Gallimore et al.; The Use of Sweep and Dihedral in Multi-stage Axial Flow Compressor Blading; Part II; Low and High Speed Designs and Test Verification; Proceedings of ASME Turbo Expo 2002; Jun. 3-6, 2002; pp. 1-11; GT-2002-30329; Amsterdam, The Netherlands.

G. Scott McNulty et al.; The Impact of Forward Swept Rotors on Tip-Limited Low-Speed Axial Compressors; Proceedings of ASME Turbo Expo 2003 Power for Land, Sea, and Air; Jun. 16-19, 2003; pp. 1-12; GT2003-38837; Atlanta, Georgia, USA.

C. Xu et al.; Computational Analysis on a Compressor Blade; Int. Conf. on Jets, Wakes and Separated Flows, ICJWSF-2005; Oct. 5-8, 2005; pp. 1-8; Toba-shi, Mie, Japan.

V. Gummer et al.; Using Sweep and Dihedral to Control Three-Dimensional Flow in Transonic Stators of Axial Compressors; Proceedings of ASME Turbo Expo 2000; May 8-11, 2000; pp. 1-11; 2000-GT-0491; Munich Germany.

Leroy H. Smith, Jr. et al.; Sweep and Dihedral Effects in Axial-Flow Turbomachinery; Journal of Basic Engineering; Transactions of the ASME; 1962; pp. 1-14; Paper No. 62-WA-102; printed in the U.S.A.

COMPRESSOR BLADE HAVING A RATIO OF LEADING EDGE SWEEP TO LEADING EDGE DIHEDRAL IN A RANGE OF 1:1 TO 3:1 ALONG THE RADIALLY OUTER PORTION

FIELD OF THE INVENTION

The invention relates generally to turbomachines and, more particularly, to airfoil shapes for use as rotor blades in compressors for turbomachines such as gas turbine engines.

BACKGROUND OF THE INVENTION

In a turbomachine, such as a gas turbine engine, air is pressurized in a compressor then mixed with fuel and burned in a combustor to generate hot combustion gases. The hot combustion gases are expanded within the turbine section where energy is extracted to power the compressor and to produce useful work, such as powering a propeller for an aircraft in flight or turning a generator to produce electricity. The hot combustion gas travels through a series of turbine stages. A turbine stage may include a row of stationary vanes followed by a row of rotating turbine blades, where the turbine blades extract energy from the hot combustion gas for powering the compressor and providing output power.

In a multistage axial compressor, the cooperating rows of stator vanes and rotor blades defining the stages typically decrease in size to progressively pressurize air as it passes through the stages. The compressor vanes and blades comprise corresponding airfoils which typically vary in configuration as their size decreases from stage to stage for maximizing performance of the compressor.

As air flows through the compressor, the flow or pressure distribution of the air as it is being compressed through the stator vanes and rotor blades is characterized as a complex three dimensional flow field varying circumferentially around the compressor, radially along the span of the vane and blade airfoils, and axially along the circumferentially opposite pressure and suction sides of the airfoils. The performance and stability of blade airfoils is significantly affected by the aerodynamic sweep and aerodynamic dihedral of the airfoil. In particular, it is generally desirable to develop a 3-dimensional design of a blade airfoil to include forward or aft sweep, or a combination of forward and aft sweep, depending on the particular application of the blade, to improve performance and/or stability. However, prior art airfoil designs have generally not emphasized incorporating significant dihedral into airfoils, and especially have not incorporated significant dihedral in combination with sweep.

SUMMARY OF THE INVENTION

In accordance with one aspect of the invention, a compressor airfoil is provided for pressurizing air inside a surrounding casing. The airfoil comprises laterally opposite pressure and suction sides joined together at chordally opposite leading and trailing edges and extending in span from a root to a tip. A radially inner portion and a radially outer portion of the airfoil are defined along the span. A leading edge aerodynamic sweep is defined relative to a stream surface of a flow passing the airfoil, and a leading edge aerodynamic dihedral is defined relative to the stream surface. A ratio of the leading edge sweep to the leading edge dihedral is in a range effective to reduce losses generated by interaction of tip clearance flow, secondary flows and passage shocks, the ratio being between about 1:1 to about 3:1 along the radially outer portion to the airfoil.

In accordance with another aspect of the invention, a compressor airfoil is provided for pressurizing air inside a surrounding casing. The airfoil comprises laterally opposite pressure and suction sides joined together at chordally opposite leading and trailing edges and extending in span from a root to a tip. A radially inner portion and a radially outer portion of the airfoil are defined along the span, the radially outer portion being located in a range of about 70% to about 100% span from the root. A leading edge aerodynamic sweep is defined relative to a stream surface of a flow passing the airfoil, and a leading edge aerodynamic dihedral is defined relative to the stream surface. The leading edge sweep and the leading edge dihedral both increase monotonically in a forward direction along the radially outer portion of the airfoil progressing in a radially outward direction. A transition portion is located between the radially inner portion and the radially outer portion, the transition portion being located in a range of about 50% to about 70% span from the root. Radial sections of the airfoil define centers-of-gravity wherein the centers-of-gravity are offset an increasing amount in an aft circumferential direction, opposite to the direction of blade rotation from a location adjacent to the root to the transition portion and are offset an increasing amount in a forward direction, in the direction of blade rotation, from the transition portion to the tip. The centers-of-gravity are offset an increasing amount in an axially aft direction from the root to the transition portion and are offset an increasing amount in an axially forward direction from the transition portion to the tip. A ratio of the leading edge sweep to the leading edge dihedral is in a range effective to reduce losses generated by interaction of tip clearance flow, secondary flows and passage shocks, the ratio being between about 1:1 to about 3:1 along the radially outer portion to the airfoil.

In accordance with a further aspect of the invention, a compressor blade is provided for a gas turbine engine. The compressor blade has an airfoil comprising laterally opposite pressure and suction sides joined together at chordally opposite leading and trailing edges and extending in span from a root to a tip. A radially inner portion and a radially outer portion of the airfoil is defined along the span. A leading edge aerodynamic sweep is defined relative to a stream surface of a flow passing the airfoil, and a leading edge aerodynamic dihedral is defined relative to the stream surface. The leading edge aerodynamic sweep and dihedral of the radially outer portion is designed so that tip losses generated by the interaction of tip clearance, secondary flows and passage shocks are reduced. The leading edge aerodynamic sweep and the leading edge aerodynamic dihedral are defined substantially in accordance with the values of LE Sweep and LE Dihedral, respectively, set forth at locations identified by span locations, N, 11-17 in Table 1.

In accordance with a further aspect of the invention, a compressor blade is provided for a gas turbine engine. The compressor blade has an airfoil comprising laterally opposite pressure and suction sides joined together at chordally opposite leading and trailing edges and extending in span from a root to a tip. A radially inner portion and a radially outer portion of the airfoil is defined along the span. A leading edge aerodynamic sweep is defined relative to a stream surface of a flow passing the airfoil, and a leading edge aerodynamic dihedral is defined relative to the stream surface. The leading edge aerodynamic sweep and dihedral of the radially outer portion is designed so that tip losses generated by the interaction of tip clearance, secondary flows and passage shocks are reduced. The leading edge aerodynamic sweep and the leading edge aerodynamic dihedral are defined substantially in accordance with the values of LE Sweep and LE Dihedral, respectively, set forth at locations identified by span locations, N, 11-17 in Table 2.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
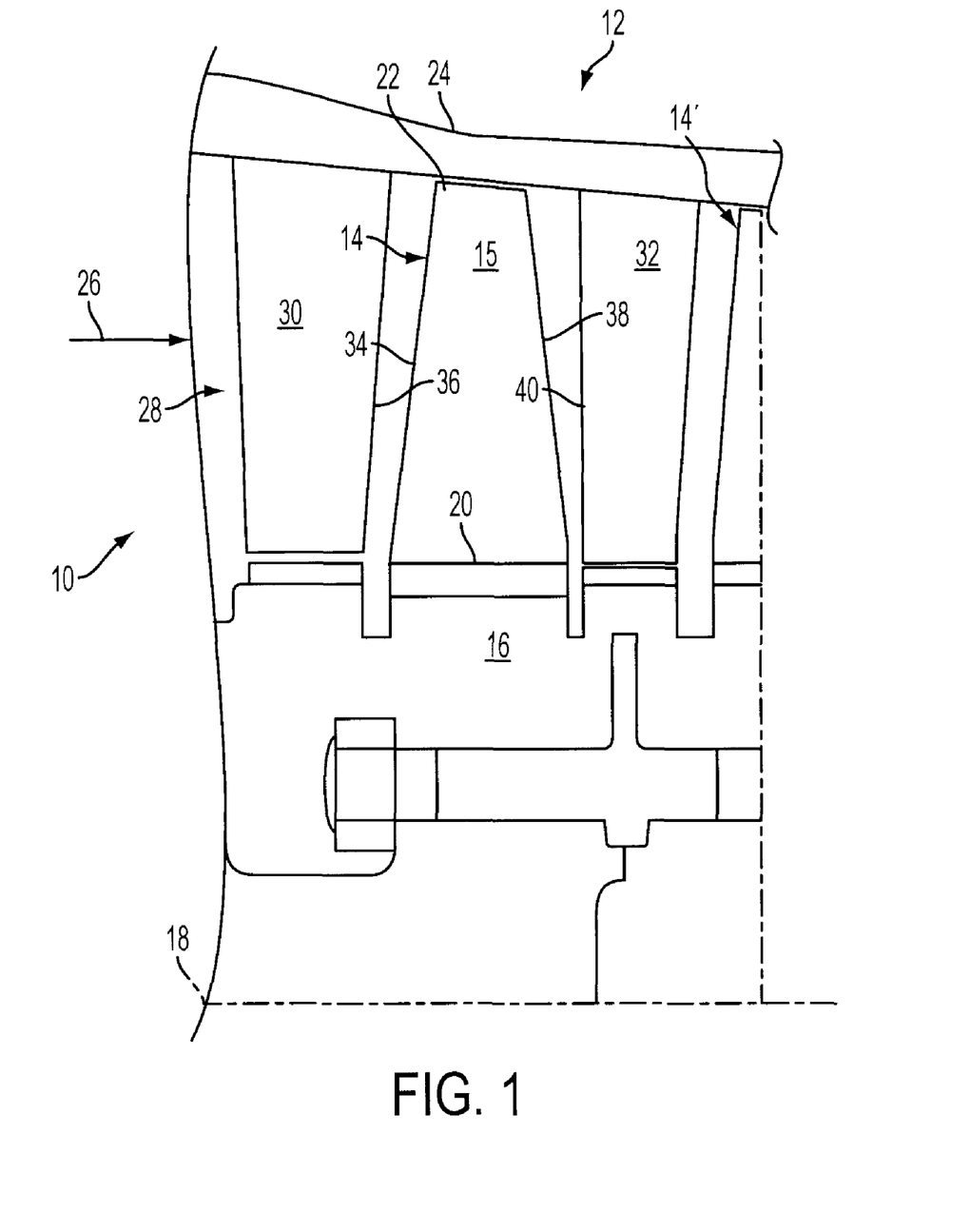
FIG. 1 is a side view of a portion of a compressor section for an exemplary gas turbine engine.

Referring to FIG. 1, portion of an exemplary compressor section 10 for a gas turbine engine 12 is shown in which a plurality of rotor or compressor blades 14 are supported in circumferentially extending rows around an annular hub 16 for rotation about a longitudinal axis centerline 18 of the turbine engine 12. Each of the blades 14 includes a root portion 20 attached to the hub 16, such as by the root portions 20 being formed with a fir-tree or dovetail shape (FIG. 2) for engagement within corresponding grooves in the hub 16, or by forming an integral assembly conventionally known as a blisk, i.e., integral bladed-disk. Each of the blades 14 further includes an exemplary blade airfoil 15 attached to the root portion 20 and having a tip 22 at a radially outer end thereof which is spaced radially inwardly from an annular casing 24 surrounding the blades 14. The hub 16 and annular casing 24 define inner and outer boundaries, respectively, for channeling a flow of air 26 through the compressor 10. The inner boundary defined by the hub 16 diverges from the centerline 18 in a downstream flow direction and forms, with the annular casing 24, a converging annular flow channel 28 for compressing air driven through the compressor 10 by the blades 14.

A row of upstream stator vanes 30 is located upstream from the row of blades 14, and a row of downstream stator vanes 32 is located downstream from the row of blades 14. Each of the blade airfoils 15 includes an upstream or leading edge 34 extending in a span-wise direction from the root portion 20 to the tip 22, and located adjacent to trailing edges 36 of the upstream vanes 30. Each of the blade airfoils 15 further includes a downstream or trailing edge 38, chordally opposite from the leading edge 34, extending in a span-wise direction from the root portion 20 to the tip 22 and located adjacent to leading edges 40 of the downstream vanes 32. The compressor 10 includes a plurality of stages, each stage comprising a row of vanes and a row of blades. For example, the row of upstream vanes 26 and adjacent row of blades 14 define an upstream stage within the compressor 10, and the row of downstream vanes 32 and an adjacent row of downstream blades 14' define a downstream stage adjacent to and downstream from the upstream stage. Additional, stages (not shown) are provided within the compressor 10 in a manner known in the art.

Figure 2:
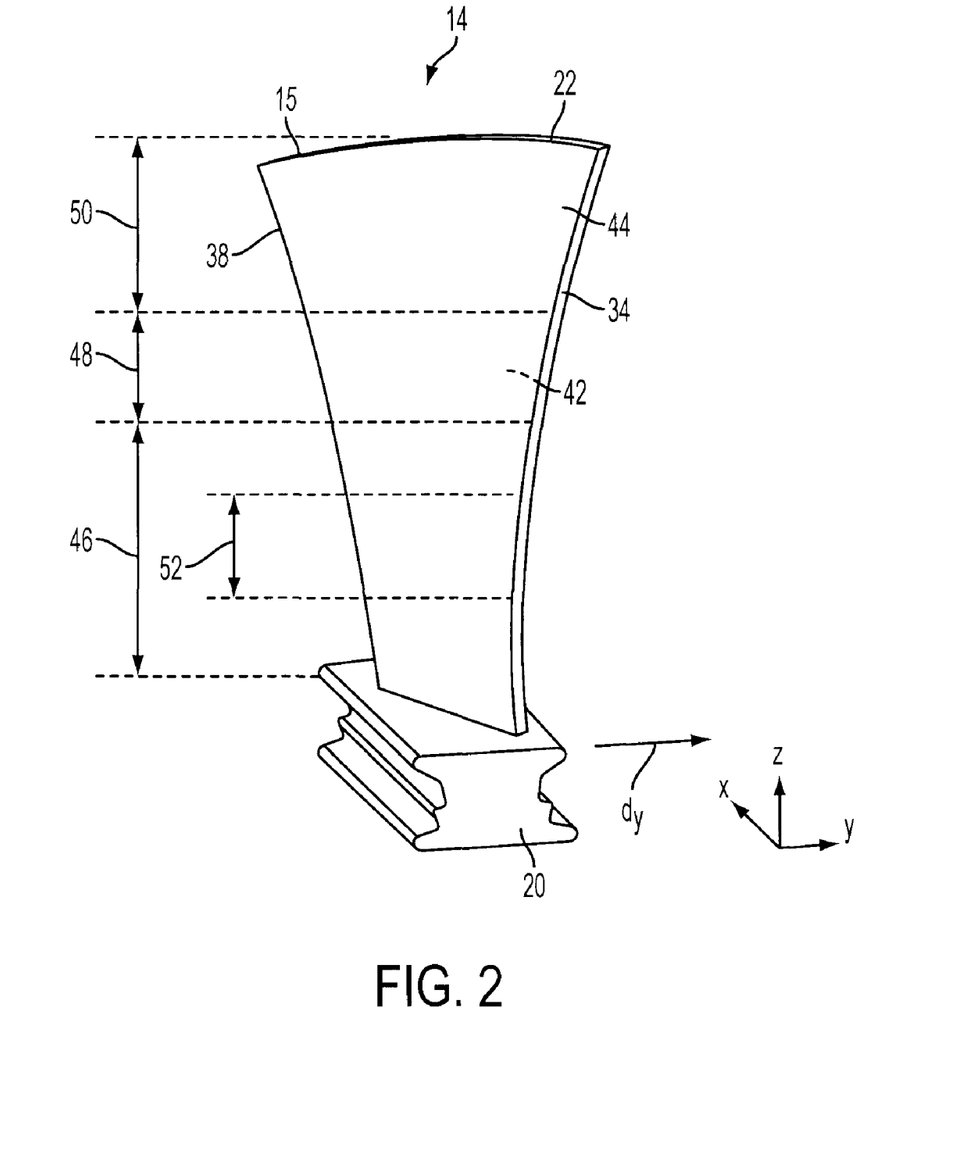
FIG. 2 is a perspective view of one embodiment of a compressor blade in accordance with the present invention.

Referring to FIG. 2, the blade airfoil 15 includes a forward or pressure side surface 42 extending from the root 20 to the tip 22 between the leading edge 34 and the trailing edge 38. The pressure side surface 42 faces in a direction of rotation of the blade 14, as indicated by direction arrow $d_y$, extending in the y-axis direction of the x-y-z coordinate system illustrated in FIG. 2. The illustrated coordinate system also includes a spanwise z-axis extending radially outwardly relative to the centerline axis 18, and an axial x-axis extending parallel to the centerline 18. The blade airfoil 15 further comprises an opposing aft or suction side surface 44 extending from the root portion 20 to the tip 22, between the leading edge 34 and the trailing edge 38 and facing in a direction opposite to the direction of blade rotation $d_y$.

For the purposes of the present explanation, the blade airfoil 15 generally comprises a radially inner portion 46, a transition portion 48, and a radially outer portion 50, The inner portion 46 extends in a range from the root portion 20 to about 50% span from the root portion 20. The transition portion 48 extends in a range of about 50% to about 70% span from the root portion 20. The outer portion 50 extends in a range of about 70% to about 100% span from the root portion 20. In addition, a radially extending intermediate section 52 is defined within the range of the inner portion 46, and extends within a range of about 15% to about 35% span from the root portion 20. The inner portion 46, transition portion 48, outer portion 50 and intermediate section 52 are configured as part of the overall airfoil design with reference to the aerodynamic sweep and aerodynamic dihedral of the blade airfoil 15 and, in particular to a relationship between the aerodynamic sweep and aerodynamic dihedral of the blade airfoil 15, to provide an improved performance with a predetermined level of stability, as will be described further below.

Figure 3:
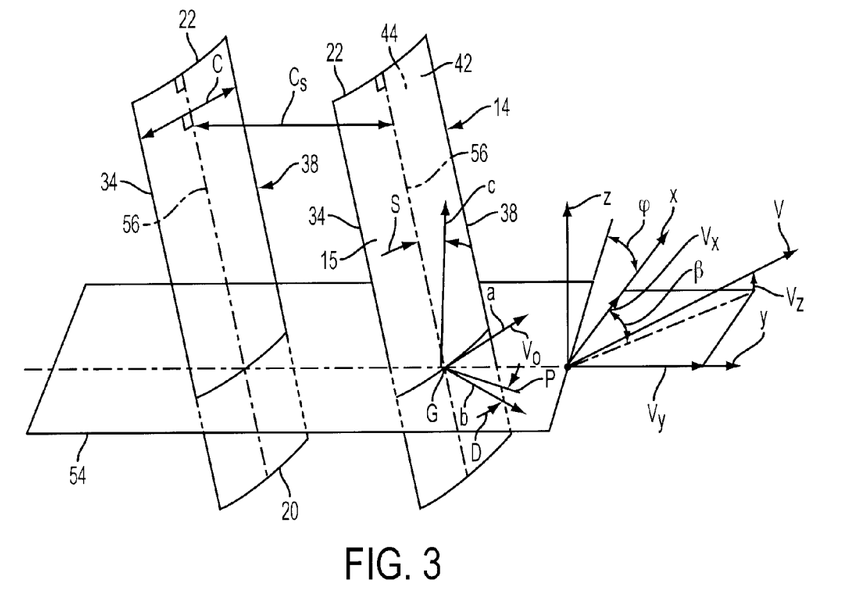
FIG. 3 is a schematic representation of compressor blades with an exemplary stream surface flowing thereover, and including exemplary coordinate systems and parameters for defining aerodynamic sweep and aerodynamic dihedral.

Flow of the air 26 through the compressor 10 generally occurs in three dimensions. The blade airfoil 15 is typically oriented at a twist angle relative to the incoming air 26 thus providing three components of relative velocity at each radial location on the airfoil 15. For the purposes of defining the terms "sweep" and "dihedral" herein, FIG. 3 schematically depicts two of the blades 14, having forward sweep, with a representative axisymmetric stream surface 54 passing through one of the radial sections of the airfoil 15. It is understood that conventional 2-D streamlines are projections of the 3-D stream surfaces 54 over the blade 14. Each of the airfoils 15 includes a chord C extending from the leading edge 34 to the trailing edge 38 at each radial section, and the length of the chord C may vary along the span of the airfoil 15. The blades 14 are also conventionally circumferentially spaced from each other along the y-axis at a distance $C_s$. The relative velocity vector V lying in the axisymmetric stream surface 54 may be represented by its respective velocity vector components relative to the x-y-z coordinate system $V_x$, $V_y$ and $V_z$ as shown. The relative velocity vector V is represented at a location adjacent to the blade airfoil 15 by the velocity vector $V_0$, where velocity vector $V_0$ is aligned with the relative velocity vector V.

A sweep angle S and dihedral angle D may be defined for any location on the airfoil 15. For the present example, the sweep angle S and dihedral angle D are described with reference to a location corresponding to the airfoil axis 56, and with reference to a point G where the stream surface 54 intersects the airfoil axis 56. A Cartesian coordinate system a-b-c is defined with an origin at point G, with the a-axis coinciding with the velocity vector $V_0$, the b-axis extending normal to the airfoil surface, and the c-axis tangential to the airfoil surface. The sweep angle, S, is defined as the angle between the c-axis and the airfoil axis 56. The dihedral angle, D, is defined as the angle between the b-axis and the projection of the b-axis onto the stream surface 54, as denoted by line P.

Figure 4:
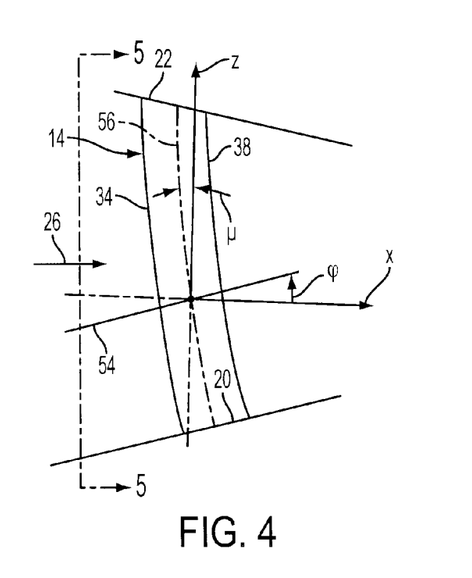
FIG. 4 is a schematic representation of one of the compressor blades and the stream surface illustrated in FIG. 3.
Figure 5:
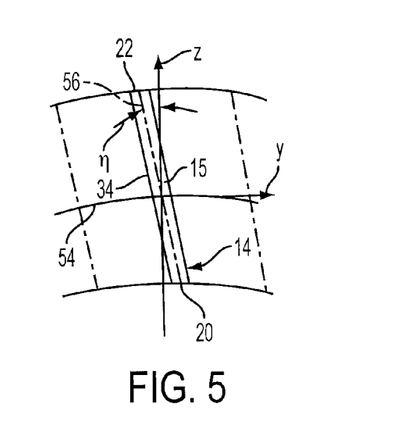
FIG. 5 is a schematic representation of one of the compressor blades and the stream surface illustrated in FIGS. 3 and 4, taken along line 5-5 in FIG. 4.

FIGS. 4 and 5 are additional schematic representations of the airfoil 15 defining additional parameters relative to the stream surface 54 and the airfoil axis 56 in terms of a conventional vector diagram in the x-y-z coordinate system.

The aerodynamic sweep angle S and the aerodynamic dihedral angle D may be represented as follows:

$$\mathrm{Sin} S = \frac{\tan\varphi + \tan\mu + \tan\eta \tan\beta}{\sqrt{(1 + \tan^2\eta + \tan^2\mu)(1 + \tan^2\beta + \tan^2\varphi)}} \quad (1)$$

$$\mathrm{Sin} D = \frac{\sec\varphi \tan\eta - \tan\beta(\sin\varphi + \cos\varphi \tan\mu)}{\sqrt{(1 - \tan\varphi \tan\mu)^2 + (\tan\beta - \tan\varphi \tan\eta)^2 + (\tan\eta - \tan\beta \tan\mu)^2}} \quad (2)$$

Wherein, $\varphi$=meridional angle, $\arctan(V_z/V_x)$, and $V_z$ is the component of the streamline velocity V along the radial z-axis, and $V_x$ is the component of the streamline velocity V along the axial x-axis, see FIGS. 3 and 4;

$\beta$=cylindrical air angle, $\arctan(V_y/V_x)$, and $V_y$ is the component of the streamline velocity V along the circumferential y-axis, see FIG. 3;

$\mu$=the local axial tilt angle, or angle of inclination, of a longitudinally extending portion of the airfoil axis 56 of the airfoil 15 in the x-z plane relative to the radial z-axis against which the air 26 flows, see FIG. 4; and $\eta$=the local tangential lean angle, or angle of inclination, of the longitudinally extending portion of the airfoil axis 56 of the airfoil 15 in the y-z plane relative to the z-axis against which the air 26 flows, see FIG. 5.

Although FIGS. 3-5 are shown with the angles relative to the airfoil axis 567 i.e., the locus of centers of gravity of each transverse section of the airfoil 15, this is merely representative, since any local longitudinal surface of the airfoil 15 may also be used from the root 20 to the tip 22 and from the leading edge 34 to the trailing edge 38 and on both the forward surface 42 and the aft surface 44.

The velocity of the air 26 relative to the airfoils 15 increases with increasing radius from the root portion 20. Specifically, during operation of a conventional compressor having airfoils operating at supersonic tip speeds, a boundary layer of the air is centrifuged radially outwardly and accumulates along the tip region of the airfoil. Along with passage shocks and its interaction with the local boundary layer and tip leakage flow, the accumulated boundary layer results in a decrease in aerodynamic performance and stability. In accordance with an aspect of the present invention a combination of sweep and dihedral is optimized to reduce the interaction of these effects.

The invention described herein presents a compressor blade airfoil 15 that accomplishes an increase in forward aerodynamic sweep and dihedral to provide improved performance with a reduction in losses generated by interaction of tip clearance flow, secondary flows and passage shocks. In particular, the invention comprising the airfoil 15 incorporates improved performance and stability in the airfoil 15 as a result of application of a specified relationship between aerodynamic sweep and aerodynamic dihedral that reduces or minimizes the destabilizing combined effects associated with tip clearance flow, secondary flows and passage shocks, such as may be evidenced by pressure pulses and aerodynamic stall. Tip clearance flow, as used herein, refers to a leakage flow in a clearance or space between the tip portion 22 of the airfoil 15 and the curved interior surface of the casing 24 adjacent to the tip portion 22. Secondary flows, as used herein, refers to a flow of air that is essentially normal to the primary air flow 26 passing from a higher pressure region to a lower pressure region between adjacent blade airfoils 15, i.e., in the y-axis direction. Passage shocks, as used herein, refers to pressure waves that extend from the pressure surface 42 of each airfoil 15 to the suction surface 44 of the airfoil's leading neighbor.

The outer portion 50 of the blade airfoil 15 is particularly configured to address performance reducing airflow characteristics created by the boundary layer of the air that accumulates along the region of the blade tip 22 and, in accordance with the present invention, a determinative aerodynamic aspect of the blade airfoil 15 may be characterized by the leading edge aerodynamic sweep and the leading edge aerodynamic dihedral. Specifically, along the outer portion 50, both the leading edge aerodynamic sweep and the leading edge aerodynamic dihedral increase in the forward direction, proceeding from a radially inner location of the outer portion 50, i.e., approximately 70% span from the root portion 20, toward the tip 22.

Figure 6:
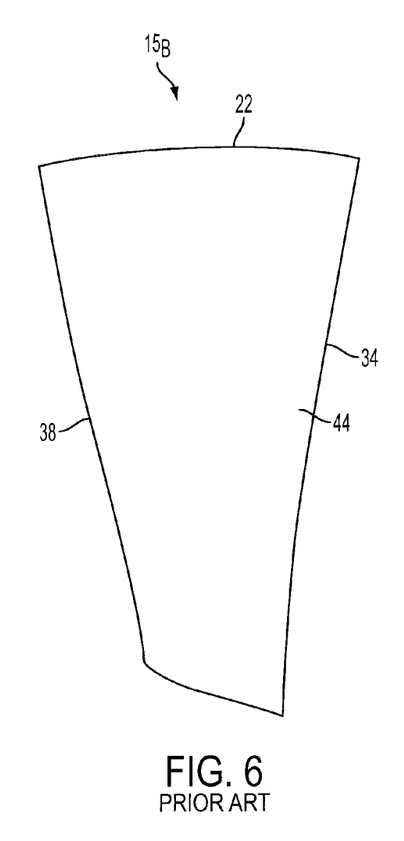
FIG. 6 is a front view of a conventional blade airfoil representing a base airfoil formed according to prior art design principles, and not incorporating any substantial amount of sweep or dihedral.
Figure 7:
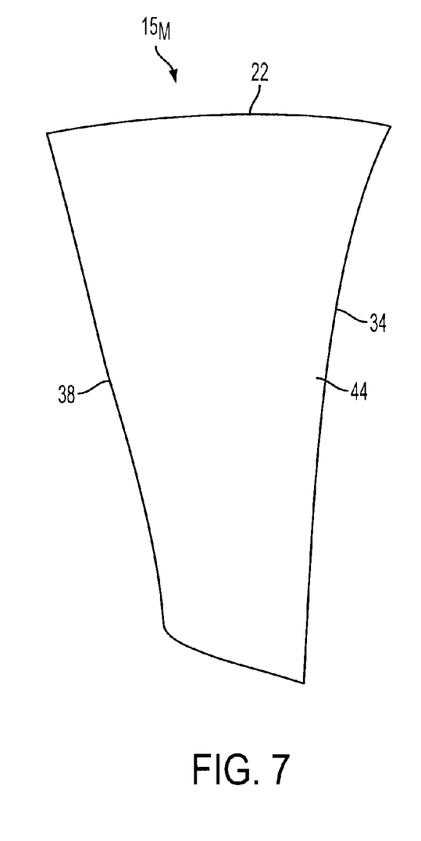
FIG. 7 is a front view of a first exemplary blade airfoil formed in accordance with the present invention.
Figure 8:
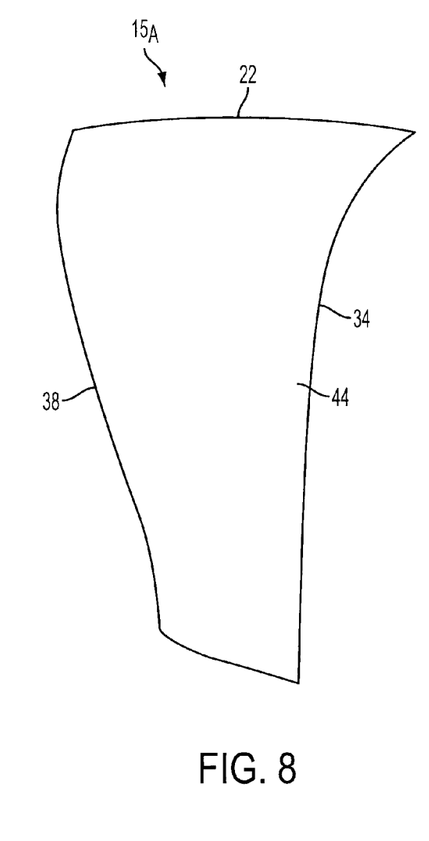
FIG. 8 is a front view of a second exemplary blade airfoil formed in accordance with the present invention.

FIGS. 7 and 8 illustrate two present airfoils constructed in accordance with the present invention, identified by $15_M$ (moderate airfoil) and $15_A$ (aggressive airfoil), respectively, and shown in comparison to an airfoil currently implemented in turbine engines, i.e., not constructed in accordance with the present invention, and identified by $15_B$ (base airfoil), as shown in FIG. 6.

Figure 9:
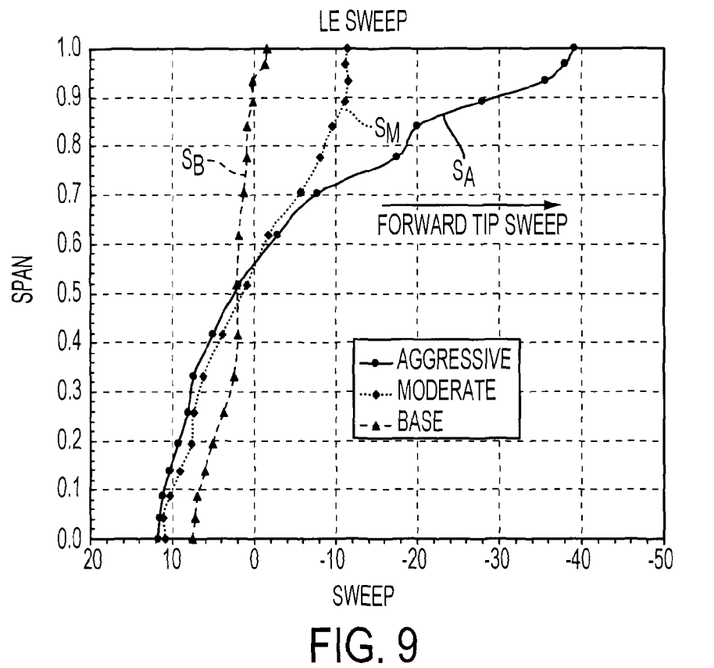
FIG. 9 is a plot of leading edge sweep vs. span showing a comparison of the aerodynamic leading edge sweep for the exemplary blade airfoils of the present invention and the aerodynamic leading edge sweep for a base blade airfoil.

FIG. 9 shows a comparison of the leading edge sweep (LE sweep) for the leading edges of the present airfoils $15_M$, $15_A$ relative to the base airfoil $15_B$. The leading edge sweep angle of the moderate airfoil $15_M$ is identified by the line $S_M$, the leading edge sweep angle of the aggressive airfoil $15_A$ is identified by the line $S_A$, and the leading edge sweep angle of the base airfoil $15_B$ is identified by the line $S_B$.

It should be understood that the values for angles along the horizontal axis of FIG. 9 depict aft sweep angles as positive (+) angles and forward sweep angles as negative (−) angles. However, in the description of the sweep angles provided herein, the direction of the sweep angle is identified by the terminology "aft sweep" and "forward sweep," using only the magnitude of the angle without reference to the positive or negative sign convention found in FIG. 9.

As seen in FIG. 9, the leading edge of the moderate and aggressive airfoils $15_M$, $15_A$ (lines $S_M$, $S_A$) are characterized by increasing forward sweep, increasing substantially monotonically from the transition portion 48 (FIG. 2) up to a location at or adjacent to the tip 22, where the forward sweep of the aggressive airfoil $15_A$ increases substantially more than the forward sweep of the moderate airfoil $15_M$. In particular, from about 70% span from the root to a location at or near about 100% span from the root, the sweep angle of the aggressive airfoil $15_A$ increases from about 8° forward sweep to about 40° forward sweep, and the sweep angle of the moderate airfoil $15_M$ in the same span increases from about 5° forward sweep to about 12° forward sweep. In contrast, within the same span of the outer portion 50 of the base airfoil $15_B$ (conventional airfoil), the base airfoil leading edge sweep angle remains substantially near 0°, transitioning from about 2° aft sweep to about 1° forward sweep.

It should be understood that the ranges of sweep angles, as well as the ranges of dihedral angles given below, may vary within the broad concept presented herein. For example, the given range for sweep angles in the outer portion 50 of present airfoils may encompass a range for forward sweep comprising about 5° forward sweep to about 45° forward sweep, and preferably is within a range of about 10° forward sweep to about 35° forward sweep.

Figure 10:
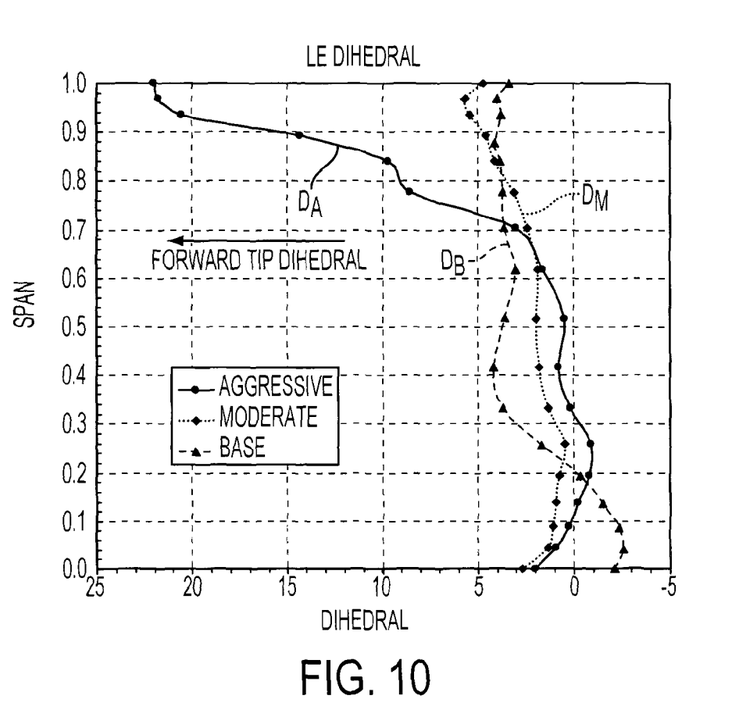
FIG. 10 is a plot of leading edge dihedral vs. span showing a comparison of the aerodynamic leading edge dihedral for the exemplary blade airfoils of FIG. 9 and the aerodynamic leading edge dihedral for the base blade airfoil.

FIG. 10 illustrates a comparison of the leading edge dihedral (LE dihedral) for the leading edges of the present airfoils $15_M$, $15_A$ relative to the leading edge of the base airfoil $15_B$. The leading edge dihedral angle of the moderate airfoil $15_M$ is identified by the line $D_M$, the leading edge dihedral angle of the aggressive airfoil $15_A$ is identified by the line $D_A$, and the leading edge dihedral angle for the base airfoil $15_B$ is identified by the line $D_B$.

It should be understood that the values for angles along the horizontal axis of FIG. 10 depict aft dihedral angles as negative (−) angles and forward dihedral angles as positive (+) angles. However, in the description of the dihedral angles provided herein, the direction of the dihedral angle is identified by the terminology "aft dihedral" and "forward dihedral," using only the magnitude of the angle without reference to the positive or negative sign convention found in FIG. 10.

From a radially outer location of the transition portion 48, i.e., at about 70% span from the root, through the outer portion 50 the present airfoils $15_M$, $15_A$ (lines $D_M$, $D_A$) depict a substantially greater increasing forward dihedral than the base airfoil line $D_B$. In particular, from about 70% span from the root to a location near or adjacent to about 100% span from the root, the dihedral angle of the moderate airfoil $15_M$ may increase through the outer portion 50 from about 2.5° forward dihedral up to about 6° forward dihedral at a location near the tip 22, and the dihedral angle of the aggressive airfoil $15_A$ may increase through the outer portion 50 from about 3° forward dihedral to about 22° forward dihedral. In contrast, within the same span of the base airfoil $15_B$ (conventional airfoil), the base airfoil leading edge dihedral angle follows a non-monotonic change, varying through the upper portion 50 from about 4° to about 3° forward dihedral. As noted above, the range of the given dihedral angles for the present airfoils may vary from the particular angles given herein. For example, the given range for dihedral angles may encompass a preferred range for dihedral angles comprising about 5° forward dihedral to about 22.5° forward dihedral. The particular sweep and dihedral angles and/or ranges of sweep and dihedral angles may vary within the scope of the present invention depending on the particular aerodynamic and mechanical requirements of the airfoil 15.

Figure 11:
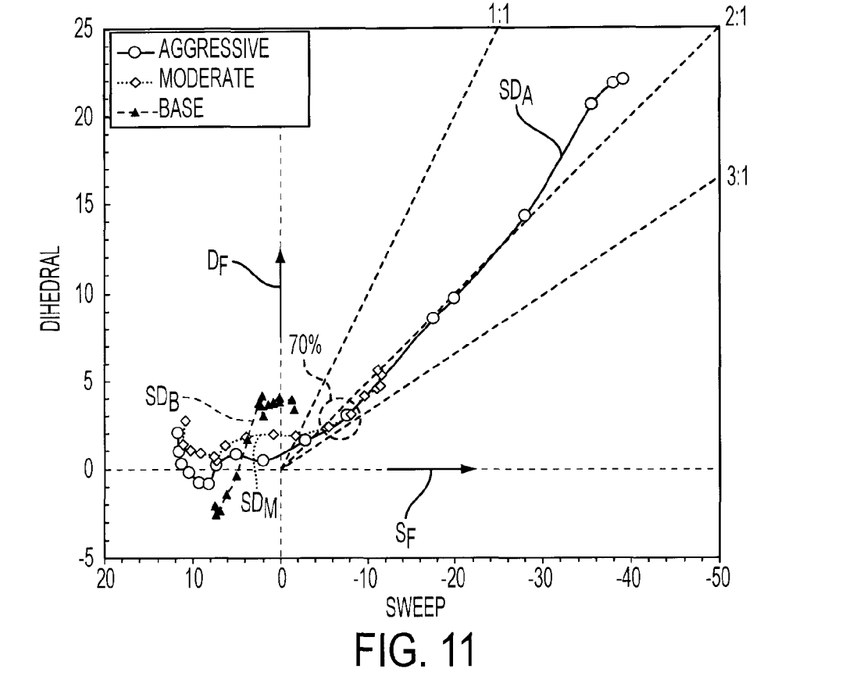
FIG. 11 is a plot of leading edge sweep vs. dihedral showing a comparison of the ratio of leading edge sweep to dihedral for the exemplary blade airfoils of the present invention and the base blade airfoil.

Referring to FIG. 11, the described benefits of the present invention are obtained within the ranges noted for the respective sweep angles and dihedral angles by maintaining a particular relationship between the forward sweep angle and forward dihedral angle along the outer portion 50 of the airfoil 15. As seen in FIG. 11, the arrow $S_F$ identifies the area of the plot corresponding to a forward sweep angle and the arrow $D_F$ identifies the area plot corresponding to a forward dihedral angle. The sweep angle versus dihedral angle plot for the moderate airfoil $15_M$ is shown as line $SD_M$, the sweep angle versus dihedral angle plot for the aggressive airfoil $15_A$ is shown as line $SD_A$, and the sweep angle versus dihedral angle plot for the base airfoil $15_B$ is shown as line $SD_B$. The plot of FIG. 11 illustrates a general range within which the sweep angle and dihedral angle may fall while providing the performance benefits described herein. Specifically, the range of sweep angles and dihedral angles for the present airfoils $15_M$, $15_A$ (lines $SD_M$, $SD_A$) preferably fall within the plot area defined by the ratio of sweep to dihedral angle, where the sweep angle-to-dihedral angle ratio is maintained within a range of 1:1 to 1:3 throughout the outer portion 50, i.e., from about 70% to about 100% span from the root, in order to reduce losses generated by interaction of tip clearance flow, secondary flows and passage shocks. Most preferably, the sweep to dihedral angle is maintained at or close to a ratio of 2:1 throughout the outer portion 50. It can be seen that the base airfoil $15_B$ is defined by sweep and dihedral angles that do not provide the relationship of the present invention, as depicted by the line $SD_B$. It is noted that some prior art blade airfoils may include various amounts of sweep, but the dihedral of such prior art airfoils is believed to be insignificant, typically falling near 0°, and such prior art blade airfoils do not provide the ratio of sweep to dihedral described herein.

To obtain the described characteristics for airfoil shape, as defined by the described sweep angle in combination with the described dihedral angle in the outer portion 50 of the present airfoils $15_M$, $15_A$, an inboard region of the airfoils $15_M$, $15_A$ comprising the inner portion 46 or both the inner portion 46 and at least a portion of the transition portion 48 of the airfoils $15_M$, $15_A$ is designed to substantially offset stresses at the root portion 20 associated with centrifugal forces generated during rotation of the blade 14. That is, peak stresses in the airfoils $15_M$, $15_A$ are prevented or limited from increasing by designing the inboard region at the inner portion 46 of the airfoils $15_M$, $15_A$ to move the center-of-gravity of the airfoil sections for the airfoils $15_M$, $15_A$ to particular locations in accordance with the present invention.

Figure 12:
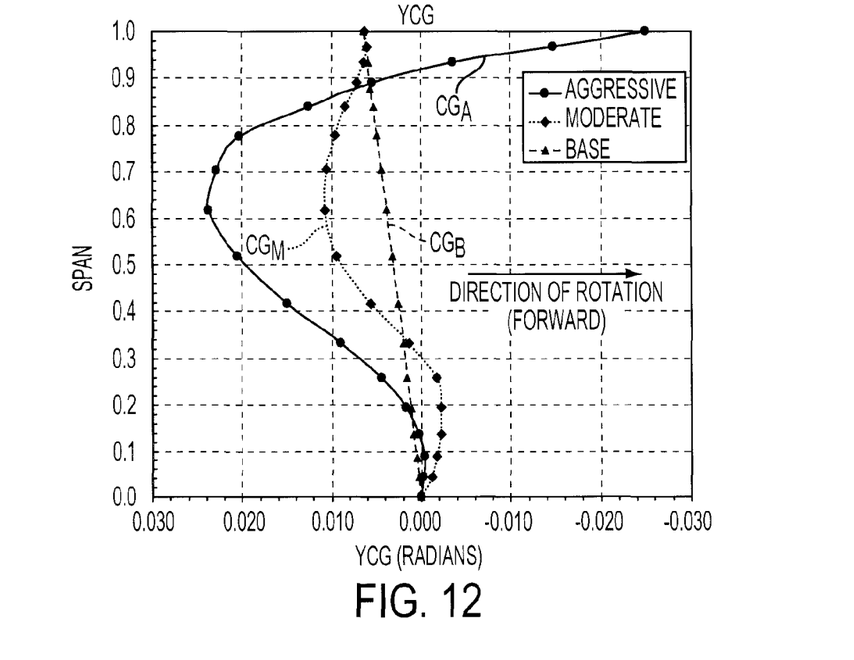
FIG. 12 is a plot of the tangential center-of-gravity, parallel to the direction of blade rotation, (y-cg) vs. span showing a comparison of the y-cg for the exemplary blade airfoils of the present invention and the y-cg for the base blade airfoil.
Figure 13:
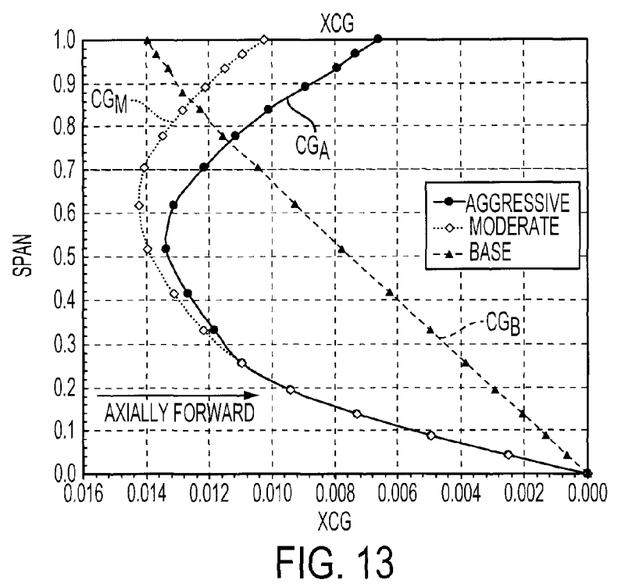
FIG. 13 is a plot of the center-of-gravity in the axial direction, parallel to a centerline through the turbine, (x-cg) vs. span showing a comparison of the x-cg for the exemplary blade airfoils of the present invention and the x-cg for the base blade airfoil.

Referring to FIGS. 12 and 13, the center-of-gravity locations for the present airfoils $15_M$, $15_A$ (lines $CG_M$, $CG_A$) are shown relative to the center-of-gravity locations for the base airfoil $15_B$ (line $CG_B$). FIG. 12 shows the tangential center-of-gravity, identified at angular locations displaced in a circumferential direction parallel to the blade rotation and taken about the turbine centerline 18 in the z-y plane. It can be seen that the centers-of-gravity, $CG_M$, $CG_A$, for the sections of the present airfoils $15_M$, $15_A$ are substantially displaced an increasing angular amount in the aft circumferential direction, i.e., in the direction opposite to the direction of rotation of the blade 14, from about 10% to 30% span from the root portion 20 (intermediate section 52) up to about 55% to 65% span from the root portion 20, and more specifically up to about 60% span from the root portion 20. The centers-of-gravity (lines $CG_M$, $CG_A$) transition at or about 60% span, and are substantially displaced an increasing angular amount in the forward circumferential direction (in the direction of rotation) throughout the outer portion 50 from about 60% span up to or near the tip 22. In contrast, it can be seen that the center-of-gravity, $CG_B$, for the sections of the base airfoil $15_B$ (conventional airfoil) are displaced substantially linearly from the root portion 20 up to the tip 22, providing a relatively small increasing offset of the base airfoil center-of-gravity in the aft direction.

FIG. 13 illustrates the axial center-of-gravity displacement in the axial direction, parallel to the turbine centerline 18, where it can be seen that the centers-of-gravity $CG_M$, $CG_A$ for the present airfoils $15_M$, $15_A$ are substantially displaced an increasing amount in the axially aft direction, i.e., in the direction of airflow, from the root portion 20 up to about 50% to 70% span from the root portion 20, and more specifically up to a section defined by a range of about 55% to 65% span. At about 55% to 65% span, the centers-of-gravity transition and are substantially displaced an increasing amount in the axially forward direction from the transition portion 48 throughout the outer portion 50 up to the tip 22. In contrast, it can be seen that the centers-of-gravity, $CG_B$, for the sections of the base airfoil $15_B$ (conventional airfoil) are displaced a substantial amount in the axially aft direction, and are displaced substantially linearly from the root portion 20 up to the tip 22, providing an increasing offset of the base airfoil center-of-gravity in the axially aft direction.

Hence, the center-of-gravity offset for the present airfoils $15_M$, $15_A$ in both the tangential (circumferential) and axial directions are non-linear to obtain the forward sweep and dihedral angles in the outer portion of the present airfoils above a transition area that may occur at 50% to 80% span. That is, in order to obtain the sweep and dihedral relationship described herein, the center-of-gravity distributions, for both the tangential and axial centers-of-gravity, are offset in the aft direction in the inboard sections (inner portion 46), and are offset in the forward direction in the outboard sections (outer portion 50), with a transition, or peak, in the center-of-gravity distributions, illustrated herein as occurring at or about 60% span.

Figure 14:
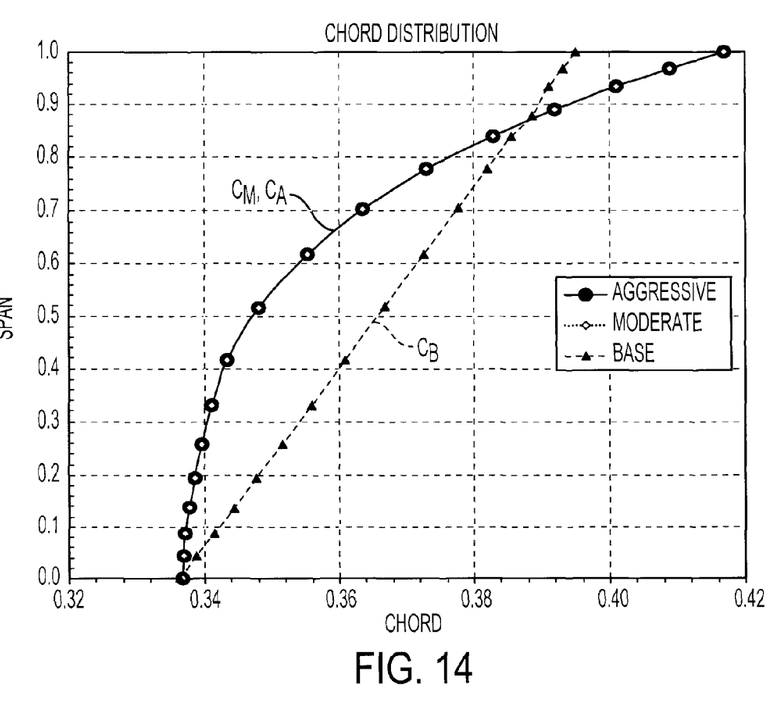
FIG. 14 is a plot of chord vs. span showing a comparison of the chord distribution for the exemplary blade airfoils of the present invention and the base blade airfoil.

Referring to FIG. 14, a plot of the chord distribution of the present airfoils $15_M$, $15_A$ is shown in comparison to the chord distribution of the base airfoil $15_B$. While the base airfoil $15B$ uses a linear chord distribution (line $C_B$) from the root portion 20 to the tip 22, it can be seen that the present airfoils $15_M$, $15_A$ comprise a non-linear increasing chord distribution (lines $C_M$, $C_A$) to facilitate obtaining additional forward sweep and dihedral above 70% span without incurring additional stresses that may be caused by the significant center-of-gravity offsets described herein.

It should be noted that although the present airfoils are described herein with particular reference to the moderate airfoil $15_M$ and aggressive airfoil $15_A$, the present invention is not limited to these particular airfoils and may encompass any airfoil constructed within the general teachings described with reference to the present airfoils $15_M$, $15_A$.

A particular embodiment of the airfoil 15 generally characterized above may be described with reference to the Cartesian coordinate system illustrated in FIG. 2 as it describes the turbine airfoil 15. In particular, Tables 1 and 2 below characterize the moderate airfoil $15_M$ and the aggressive airfoil $15_A$, respectively. Table 3 characterizes the base airfoil $15_B$ (conventional airfoil) for comparison to the airfoils $15_M$, $15_A$ of the present invention. Tables 1, 2 and 3 provide values for chord, leading edge sweep and dihedral, and centers-of-gravity in the x and y directions for specific points, N, along the span of the airfoil 15 from the root portion 20 (N=1) to the tip 22 (N=17). The span values are given as a fraction of the total span, where the total span equals 1. The chord values are given in meters. The sweep and dihedral values for the leading and trailing edges are given in degrees. The x-cg coordinate is given in meters as a displacement in the x direction from the x-cg coordinate for the center-of-gravity of the radially innermost section of the airfoil 15, and the y-cg coordinate is given in radians as an angle of a radial line in the z-y plane with an origin at the centerline 18.

TABLE 1

(Airfoil $15_M$)

| N | Span | Chord (m) | LE Sweep (deg) | LE Dihedral (deg) | x-cg (m) | y-cg (rad) |
|---|---|---|---|---|---|---|
| 1 | 0.0000 | 0.3366 | 10.86 | 2.70 | 0.0000 | 0.0000 |
| 2 | 0.0434 | 0.3369 | 11.14 | 1.35 | 0.0025 | −0.0012 |
| 3 | 0.0883 | 0.3372 | 10.32 | 1.05 | 0.0049 | −0.0017 |
| 4 | 0.1382 | 0.3377 | 9.11 | 0.92 | 0.0073 | −0.0022 |
| 5 | 0.1944 | 0.3385 | 7.62 | 0.70 | 0.0094 | −0.0022 |
| 6 | 0.2582 | 0.3396 | 7.34 | 0.45 | 0.0110 | −0.0017 |
| 7 | 0.3314 | 0.3411 | 6.26 | 1.30 | 0.0122 | 0.0013 |
| 8 | 0.4167 | 0.3433 | 3.97 | 1.82 | 0.0131 | 0.0057 |
| 9 | 0.5169 | 0.3480 | 0.86 | 1.94 | 0.0139 | 0.0094 |
| 10 | 0.6178 | 0.3553 | −1.72 | 1.88 | 0.0142 | 0.0107 |
| 11 | 0.7043 | 0.3634 | −5.60 | 2.38 | 0.0140 | 0.0105 |
| 12 | 0.7780 | 0.3729 | −8.08 | 3.09 | 0.0135 | 0.0095 |
| 13 | 0.8399 | 0.3829 | −9.61 | 4.12 | 0.0128 | 0.0084 |
| 14 | 0.8914 | 0.3920 | −11.09 | 4.58 | 0.0121 | 0.0072 |
| 15 | 0.9336 | 0.4010 | −11.59 | 5.39 | 0.0115 | 0.0064 |
| 16 | 0.9682 | 0.4090 | −11.22 | 5.62 | 0.0109 | 0.0060 |
| 17 | 1.0000 | 0.4170 | −11.42 | 4.73 | 0.0102 | 0.0063 |

TABLE 2

(Airfoil $15_A$)

| N | Span | Chord (m) | LE Sweep (deg) | LE Dihedral (deg) | x-cg (m) | y-cg (rad) |
|---|---|---|---|---|---|---|
| 1 | 0.0000 | 0.3366 | 11.70 | 2.01 | 0.0000 | 0.0000 |
| 2 | 0.0434 | 0.3369 | 11.57 | 0.97 | 0.0025 | −0.0003 |
| 3 | 0.0882 | 0.3372 | 11.18 | 0.26 | 0.0049 | −0.0003 |
| 4 | 0.1381 | 0.3377 | 10.40 | −0.25 | 0.0073 | 0.0002 |
| 5 | 0.1942 | 0.3385 | 9.31 | −0.81 | 0.0094 | 0.0017 |
| 6 | 0.2580 | 0.3396 | 8.17 | −0.87 | 0.0110 | 0.0045 |
| 7 | 0.3312 | 0.3411 | 7.35 | 0.21 | 0.0118 | 0.0090 |
| 8 | 0.4165 | 0.3433 | 5.06 | 0.79 | 0.0127 | 0.0150 |
| 9 | 0.5167 | 0.3480 | 1.92 | 0.45 | 0.0134 | 0.0205 |

TABLE 2-continued (Airfoil 15$_A$)

| N | Span | Chord (m) | LE Sweep (deg) | LE Dihedral (deg) | x-cg (m) | y-cg (rad) |
|---|---|---|---|---|---|---|
| 10 | 0.6176 | 0.3553 | −2.93 | 1.60 | 0.0131 | 0.0237 |
| 11 | 0.7042 | 0.3634 | −7.68 | 3.04 | 0.0121 | 0.0228 |
| 12 | 0.7779 | 0.3729 | −17.53 | 8.55 | 0.0111 | 0.0203 |
| 13 | 0.8399 | 0.3829 | −19.99 | 9.68 | 0.0101 | 0.0126 |
| 14 | 0.8914 | 0.3920 | −28.00 | 14.32 | 0.0089 | 0.0054 |
| 15 | 0.9337 | 0.4010 | −35.63 | 20.57 | 0.0079 | −0.0036 |
| 16 | 0.9682 | 0.4090 | −37.95 | 21.79 | 0.0073 | −0.0147 |
| 17 | 1.0000 | 0.4170 | −39.15 | 22.02 | 0.0066 | −0.0249 |

TABLE 3

(Airfoil 15$_B$)

| N | Span | Chord (m) | LE Sweep (deg) | LE Dihedral (deg) | x-cg (m) | y-cg (rad) |
|---|---|---|---|---|---|---|
| 1 | 0.0000 | 0.3362 | 7.47 | −2.10 | 0.0000 | 0.0000 |
| 2 | 0.0429 | 0.3387 | 7.29 | −2.59 | 0.0006 | 0.0003 |
| 3 | 0.0875 | 0.3414 | 6.92 | −2.36 | 0.0013 | 0.0005 |
| 4 | 0.1374 | 0.3444 | 6.12 | −1.47 | 0.0021 | 0.0008 |
| 5 | 0.1937 | 0.3477 | 5.08 | −0.36 | 0.0029 | 0.0012 |
| 6 | 0.2578 | 0.3515 | 3.73 | 1.66 | 0.0039 | 0.0016 |
| 7 | 0.3315 | 0.3558 | 2.45 | 3.72 | 0.0050 | 0.0020 |
| 8 | 0.4171 | 0.3608 | 2.01 | 4.15 | 0.0063 | 0.0025 |
| 9 | 0.5176 | 0.3667 | 2.18 | 3.56 | 0.0078 | 0.0032 |
| 10 | 0.6186 | 0.3726 | 1.90 | 3.05 | 0.0093 | 0.0038 |
| 11 | 0.7050 | 0.3777 | 1.31 | 3.63 | 0.0104 | 0.0044 |
| 12 | 0.7784 | 0.3820 | 0.87 | 3.69 | 0.0116 | 0.0049 |
| 13 | 0.8402 | 0.3856 | 0.83 | 3.81 | 0.0123 | 0.0053 |
| 14 | 0.8780 | 0.3886 | 0.15 | 4.07 | 0.0129 | 0.0056 |
| 15 | 0.9335 | 0.3911 | 0.10 | 3.77 | 0.0133 | 0.0059 |
| 16 | 0.9681 | 0.3931 | −1.33 | 3.96 | 0.0137 | 0.0062 |
| 17 | 1.0000 | 0.3950 | −1.56 | 3.36 | 0.0140 | 0.0064 |

The points given by span locations N=11 to N=17 identify locations along the outer portion 50 of the airfoil 15, corresponding to locations of particular interest for the present invention with regard to the leading edge sweep and leading edge dihedral It should be understood that values not specifically provided in Tables 1, 2 and 3 for the chord, the leading edge sweep and dihedral, and the x and y centers-of-gravity may be determined by interpolation from the successive points given in Tables 1, 2 and 3.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A compressor airfoil for pressurizing air inside a surrounding casing, said airfoil comprising:
laterally opposite pressure and suction sides joined together at chordally opposite leading and trailing edges and extending in span from a root to a tip;
a radially inner portion and a radially outer portion of said airfoil defined along said span;
a leading edge aerodynamic sweep defined relative to a stream surface of flow passing said airfoil;
a leading edge aerodynamic dihedral defined relative to said stream surface; and
a ratio of said leading edge sweep to said leading edge dihedral being in a range effective to reduce losses generated by interaction of tip clearance flow, secondary flows and passage shocks, said ratio being between about 1:1 to about 3:1 along said radially outer portion to said airfoil.

2. The airfoil of claim 1, wherein said radially outer portion of said airfoil is located in a range of about 70% to about 100% span from said root.

3. The airfoil of claim 2, wherein said leading edge sweep and said leading edge dihedral both increase in a forward direction along said radially outer portion of said airfoil progressing in a radially outward direction.

4. The airfoil of claim 3, including a transition portion between about 50% to about 70% span from said root, wherein radial sections of said airfoil have centers-of-gravity that are offset an increasing amount in an aft circumferential direction, opposite to the direction of blade rotation, from a location adjacent to said root to said transition portion and that are offset an increasing amount in a forward circumferential direction, in the direction of blade rotation, from said transition portion to said tip.

5. The airfoil of claim 4, wherein said radial sections of said airfoil have centers-of-gravity that are offset an increasing amount in an axially aft direction from said root to said transition portion and that are offset an increasing amount in an axially forward direction from said transition portion to said tip.

6. The airfoil of claim 3, wherein a chord distribution defined by a variation in the chord of the airfoil with increasing span comprises a non-linear increasing chord distribution.

7. The airfoil of claim 2, wherein said ratio of leading edge sweep to leading edge dihedral is substantially equal to 2:1 along said radially outer portion of said airfoil.

8. The airfoil of claim 2, wherein said sweep is within a range of about 10° to about 45° forward sweep along said radially outer portion.

9. The airfoil of claim 2, wherein said dihedral is within a range of about 5° to about 22.5° forward dihedral along at least a portion of said radially outer portion.

10. The airfoil of claim 9, wherein said forward sweep and said forward dihedral both increase monotonically along said radially outer portion of said airfoil to a location adjacent to said tip.

11. A compressor airfoil for pressurizing air inside a surrounding casing, said airfoil comprising:
laterally opposite pressure and suction sides joined together at chordally opposite leading and trailing edges and extending in span from a root to a tip;
a radially inner portion and a radially outer portion of said airfoil defined along said span, said radially outer portion being located in a range of about 70% to about 100% span from said root;
a leading edge aerodynamic sweep defined relative to a stream surface of a flow passing said airfoil;
a leading edge aerodynamic dihedral defined relative to said stream surface;
said leading edge sweep and said leading edge dihedral both increasing monotonically in a forward direction along said radially outer portion of said airfoil progressing in a radially outward direction;
a transition portion located between said radially inner portion and said radially outer portion, said transition portion being located in a range of about 50% to about 70% span from said root;
radial sections of said airfoil defining centers-of-gravity wherein said centers-of-gravity are offset an increasing amount in an aft circumferential direction, opposite to the direction of blade rotation from a location adjacent to said root to said transition portion and are offset an increasing amount in a forward direction, in the direction of blade rotation, from said transition portion to said tip, and said centers-of-gravity are offset an increasing amount in an axially aft direction from said root to said transition portion and are offset an increasing amount in an axially forward direction from said transition portion to said tip; and a ratio of said leading edge sweep to said leading edge dihedral being in a range effective to reduce losses generated by interaction of tip clearance flow, secondary flows and passage shocks, said ratio being between about 1:1 to about 3:1 along said radially outer portion to said airfoil.

12. The airfoil of claim 11, wherein a chord distribution defined by a variation in the chord of the airfoil with increasing span comprises a non-linear increasing chord distribution.

13. The airfoil of claim 11, wherein said ratio of leading edge sweep to leading edge dihedral is substantially equal to 2:1 along said radially outer portion of said airfoil.

14. The airfoil of claim 11, wherein said sweep is within a range of about 10° to about 45° forward sweep along said radially outer portion.

15. The airfoil of claim 14, wherein said dihedral is within a range of about 5° to about 22.5° forward dihedral along at least a portion of said radially outer portion.

16. A compressor blade for a gas turbine engine, said compressor blade having an airfoil comprising:
    laterally opposite pressure and suction sides joined together at chordally opposite leading and trailing edges and extending in span from a root to a tip;
    a radially inner portion and a radially outer portion of said airfoil defined along said span;
    a leading edge aerodynamic sweep defined relative to a stream surface of a flow passing said airfoil;
    a leading edge aerodynamic dihedral defined relative to said stream surface; and
    wherein said leading edge aerodynamic sweep and dihedral of said radially outer portion is designed so that tip losses generated by the interaction of tip clearance, secondary flows and passage shocks are reduced, said leading edge aerodynamic sweep and said leading edge aerodynamic dihedral are defined substantially in accordance with the values of LE Sweep and LE Dihedral, respectively, set forth at locations identified by span locations, N, 11-17 in Table 1.

17. The compressor blade of claim 16, wherein, along the length of said span, a chord, an axial center-of-gravity and a tangential center-of-gravity are defined substantially in accordance with the values of Chord, x-cg and y-cg, respectively, set forth at locations identified by span locations, N, 1-17 in Table 1.

18. A compressor blade for a gas turbine engine, said compressor blade having an airfoil comprising:
    laterally opposite pressure and suction sides joined together at chordally opposite leading and trailing edges and extending in span from a root to a tip;
    a radially inner portion and a radially outer portion of said airfoil defined along said span;
    a leading edge aerodynamic sweep defined relative to a stream surface of a flow passing said airfoil;
    a leading edge aerodynamic dihedral defined relative to said stream surface; and
    wherein said leading edge aerodynamic sweep and dihedral of said radially outer portion is designed so that tip losses generated by the interaction of tip clearance, secondary flows and passage shocks are reduced, said leading edge aerodynamic sweep and said leading edge aerodynamic dihedral are defined substantially in accordance with the values of LE Sweep and LE Dihedral, respectively, set forth at locations identified by span locations, N, 11-17 in Table 2.

19. The compressor blade of claim 18, wherein, along the length of said span, a chord, an axial center-of-gravity and a tangential center-of-gravity are defined substantially in accordance with the values of Chord, x-cg and y-cg, respectively, set forth at locations identified by span locations, N, 1-17 in Table 2.

* * * * *